(12) United States Patent
Patterson et al.

(10) Patent No.: US 11,572,023 B1
(45) Date of Patent: Feb. 7, 2023

(54) BIKE RACK FOR TAILGATE THAT INCLUDES MAJOR AND MINOR GATES

(71) Applicant: GM GLOBAL TECHNOLOGY OPERATIONS LLC, Detroit, MI (US)

(72) Inventors: Derek L. Patterson, Shelby Township, MI (US); Ryan Cahill, Oak Park, MI (US); William C. Bliss, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/392,022

(22) Filed: Aug. 2, 2021

(51) Int. Cl.
*B60R 9/10* (2006.01)
*B60R 9/06* (2006.01)

(52) U.S. Cl.
CPC . *B60R 9/10* (2013.01); *B60R 9/06* (2013.01)

(58) Field of Classification Search
CPC .................................. B60R 9/06; B60R 9/10
USPC ....................................................... 224/405
See application file for complete search history.

(56) References Cited

U.S. PATENT DOCUMENTS

| | | | |
|---|---|---|---|
| 10,875,442 B1* | 12/2020 | Combs, Jr. ................ | B60R 9/10 |
| 2015/0014502 A1* | 1/2015 | McCaughan ...... | B62D 33/0273 |
| | | | 248/229.2 |
| 2017/0036615 A1* | 2/2017 | Sayegh .................... | B60R 9/10 |
| 2022/0001808 A1* | 1/2022 | Low ........................ | B60R 13/01 |
| 2022/0032854 A1* | 2/2022 | Burke ...................... | B60R 9/10 |
| 2022/0063508 A1* | 3/2022 | Shneyer ................. | E05B 71/00 |

FOREIGN PATENT DOCUMENTS

CA        2757893 A1 *  5/2012   ............. B60R 9/06

* cited by examiner

*Primary Examiner* — Peter N Helvey

(57) ABSTRACT

A bike rack for a vehicle with a tailgate includes a major gate, a minor gate, and a hinge connecting the minor gate to the major gate. The minor gate includes a main body and a load stop configured to pivot relative to main body. The bike rack includes a load stop bracket and braces. The load stop bracket is configured to be placed onto the load stop when the load stop is in a vertical position such that the load stop bracket extends over a top surface of the load stop and is disposed on front and rear sides of the load stop. The braces are attached to the load stop bracket, configured to extend into holes in the hinge when the load stop bracket is placed onto the load stop, and configured to be disposed on opposite sides of a tire on a bike.

20 Claims, 7 Drawing Sheets

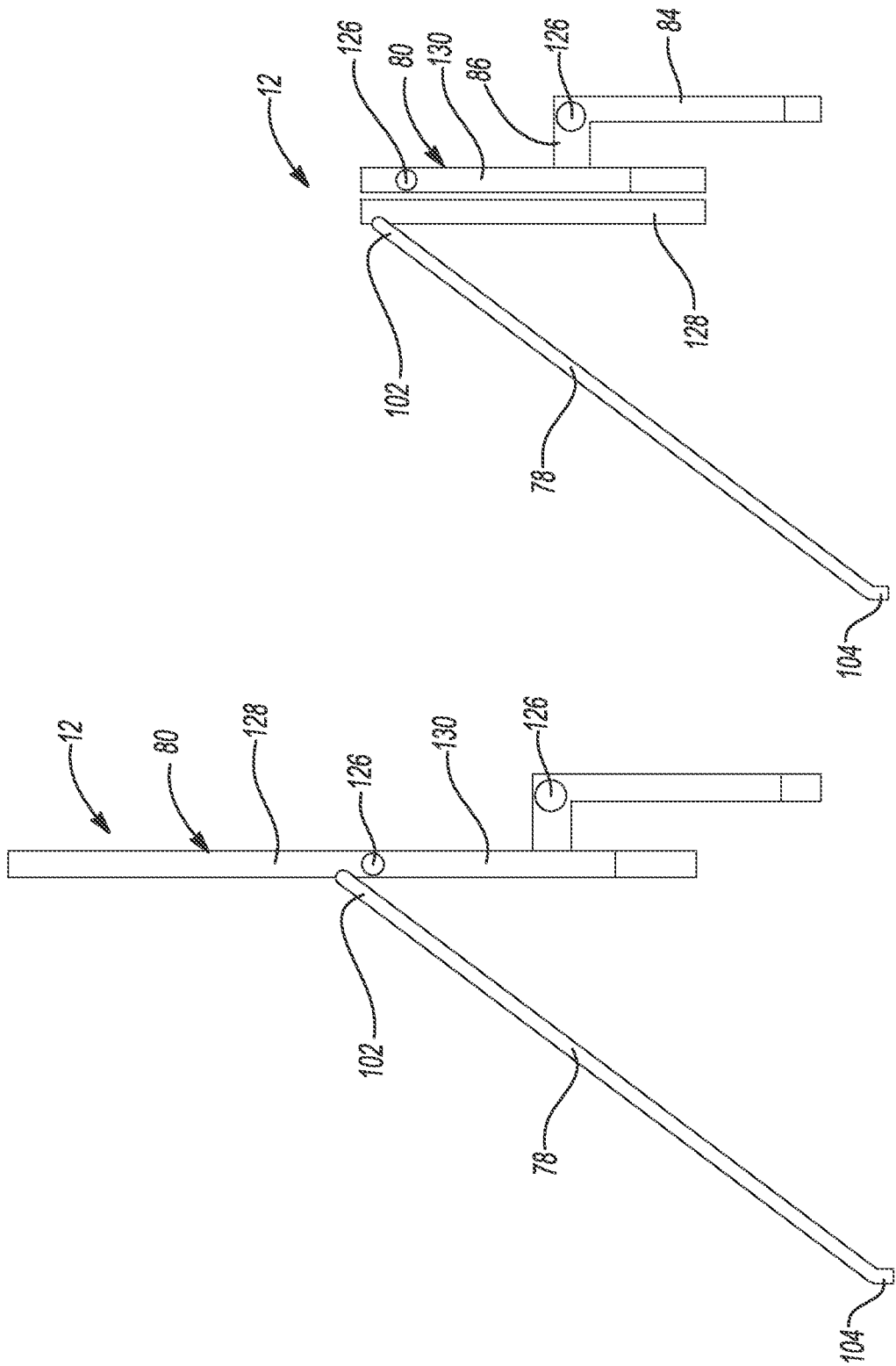

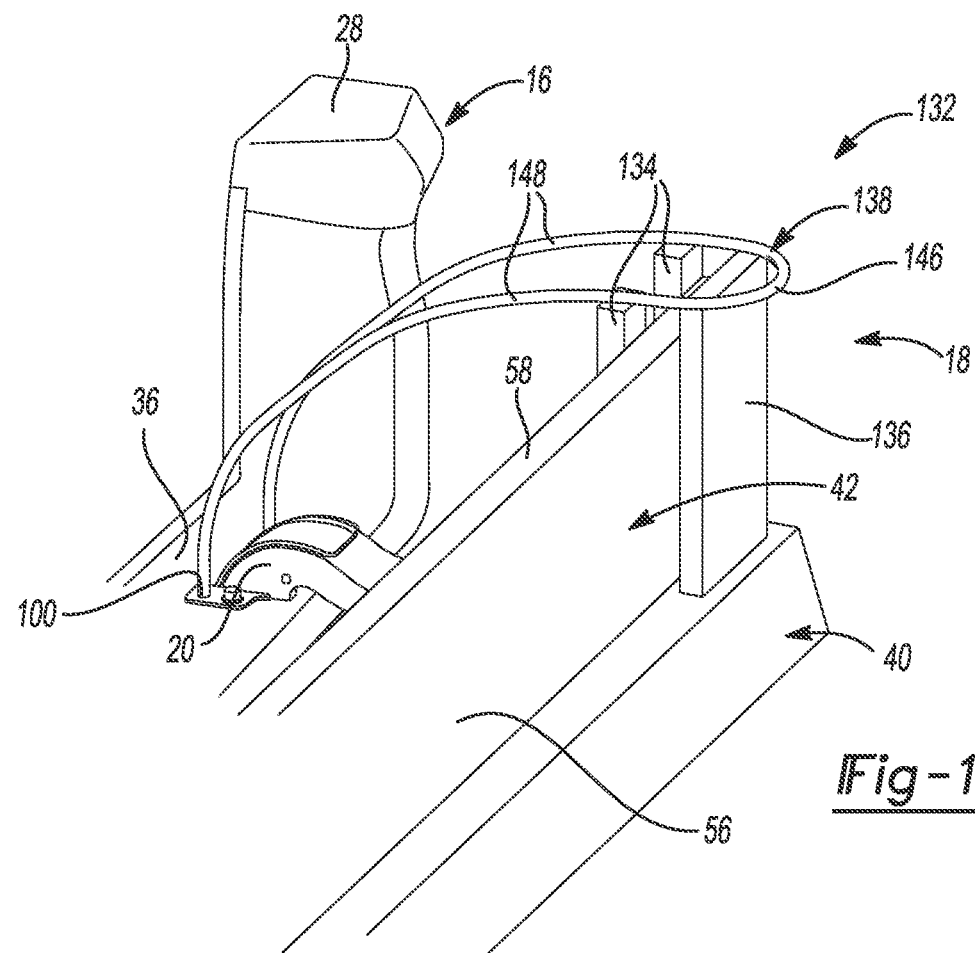
_Fig-12_
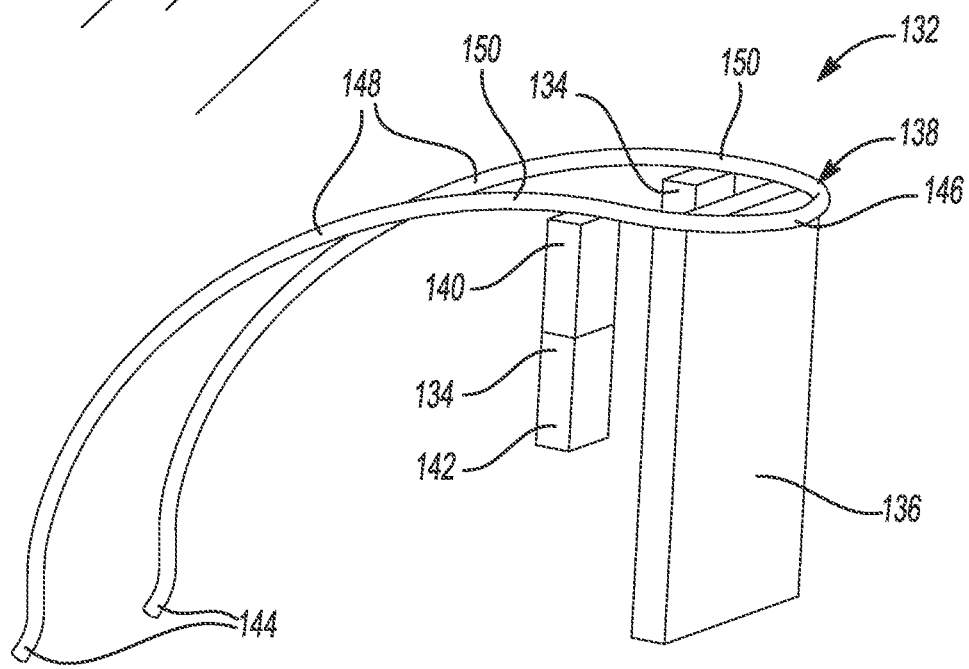
_Fig-13_

BIKE RACK FOR TAILGATE THAT INCLUDES MAJOR AND MINOR GATES

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to bike racks for a tailgate that includes major and minor gates.

Bike racks for pickup trucks are typically either mounted to a trailer hitch of a pickup truck or to the cargo bed of the pickup truck near the cabin of the pickup truck. Hitch-mounted bike racks prevent using the hitch for other purposes such as towing a trailer. Bed-mounted bike racks typically require removing the front tire and wheel of a bicycle so that the front fork of the bicycle can be secured in the bike rack. In addition, if the front tire and wheel of a bicycle is not removed before attempting to place the bicycle in the cargo bed of the pickup truck, the bicycle may not fit in the cargo bed if the length of the bicycle is greater than the length of the cargo bed.

SUMMARY

The present disclosure describes a bike rack for a vehicle with a tailgate that includes a major gate, a minor gate, and a hinge connecting the minor gate to the major gate such that the minor gate is pivotable between a vertical position and a horizontal position. The minor gate includes a main body and a load stop configured to pivot relative to main body between the vertical position and the horizontal position. In one example, the bike rack includes a load stop bracket and a pair of braces attached to the load stop bracket. The load stop bracket is configured to be placed onto the load stop when the load stop is in the vertical position such that the load stop bracket extends over a top surface of the load stop and is disposed on front and rear sides of the load stop. The braces are configured to extend into a pair of holes in the hinge when the load stop bracket is placed onto the load stop. The braces are also configured to be disposed on opposite sides of a tire on a bike.

In one aspect, the load stop bracket includes a pair of front vertical bars configured to be disposed on the front side of the load stop, a rear vertical bar configured to be disposed on the rear side of the load stop, and a horizontal bar connecting the rear vertical bar to the front vertical bars and configured to extend over the top surface of the load stop.

In one aspect, the load stop bracket further includes a crossbar connecting upper ends of the front vertical bars to one another.

In one aspect, the front vertical bars are configured to be disposed on opposite sides of the tire.

In one aspect, the horizontal bar is formed by the braces.

In one aspect, the bike rack further includes a spring-loaded mechanism configured to bias one of the front vertical bars toward the other one of the front vertical bars and thereby apply a clamping force to the tire.

In one aspect, the spring-loaded mechanism includes a pin and a spring.

The pin extends through one of the front vertical bars and into the other front vertical bar. The spring is disposed about a shaft of the pin and captured between a head of the pin and a surface of the one front vertical bar that faces away from the other front vertical bar.

In one aspect, each of the braces includes a flexible chord and a fastener configured to be inserted into one of holes in the hinge.

In one aspect, the flexible chord has a length that is less than a distance between a location where the flexible chord is attached to the load stop bracket and the one hole in the hinge in which the fastener is configured to be inserted such that the flexible chord is in tension when the bike rack is installed.

In one aspect, each of the braces includes a rigid tube having a curved end configured to be inserted into one of the holes in the hinge.

In one aspect, the braces are formed by a single rigid tube having a pair of curved ends configured to be inserted into the holes in the hinge.

In one aspect, the rigid tube forms the braces and a U-shaped section that connects the braces to one another.

In one aspect, the load stop bracket includes a pivot pin about which the load stop bracket foldable.

In another example, the bike rack includes a load stop bracket and a pair of braces attached to the load stop bracket. The load stop bracket includes a pair of front vertical bars, a crossbar connecting upper ends of the front vertical bars to one another, a rear vertical bar, and a horizontal bar connecting the rear vertical bar to the front vertical bars. The load stop bracket is configured to be placed onto the load stop when the load stop is in the vertical position such that the horizontal bar extends over a top surface of the load stop, the front vertical bars are disposed on a front side of the load stop, and the rear vertical bar is disposed on a rear side of the load stop. The braces are configured to extend into a pair of holes in the hinge when the load stop bracket is placed onto the load stop. The braces are also configured to be disposed on opposite sides of a tire on a bike.

In one aspect, each of the braces includes a flexible chord and a fastener configured to be inserted into one of holes in the hinge.

In one aspect, the braces are rigid and each of the braces has a curved end configured to be inserted into one of the holes in the hinge.

In one aspect, the rear vertical bar is T-shaped with a first rectangular section having a first length that extends vertically and a second rectangular section attached to a lower end of the first rectangular section and having a second length that extends horizontally and is less than the first length.

In another example, the bike rack includes a pair of front vertical bars, a rear vertical bar, and a rigid rod. The rigid rod includes a U-shaped section and a pair of braces projecting from opposite ends of the U-shaped section. The rigid rod connects the rear vertical bar to the front vertical bars to form a load stop bracket. The load stop bracket is configured to be placed onto the load stop when the load stop is in the vertical position such that the U-shaped section extends over a top surface of the load stop, the front vertical bars are disposed on a front side of the load stop, and the rear vertical bar is disposed on a rear side of the load stop. The braces are configured to extend into a pair of holes in the hinge when the load stop bracket is placed onto the load stop. The braces are also configured to be disposed on opposite sides of a tire on a bike.

In one aspect, the rigid rod is hollow and each of the braces has a curved end configured to be inserted into one of the holes in the hinge.

In one aspect, the front vertical bars are configured to be disposed on opposite sides of the tire.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 8 is a side view of the bike rack of FIG. 1 modified to include pivot pins about which the bike rack is foldable;

FIG. 9 is a side view of the bike rack of FIG. 8 folded about one of the pivot pins;

FIG. 12 is another perspective view of the tailgate and the bike rack of FIG. 10; and FIG. 13 is a perspective view of the bike rack of FIG. 10 by itself.

In the drawings, reference numbers may be reused to identify similar and/or identical elements.

DETAILED DESCRIPTION

Figure 1:
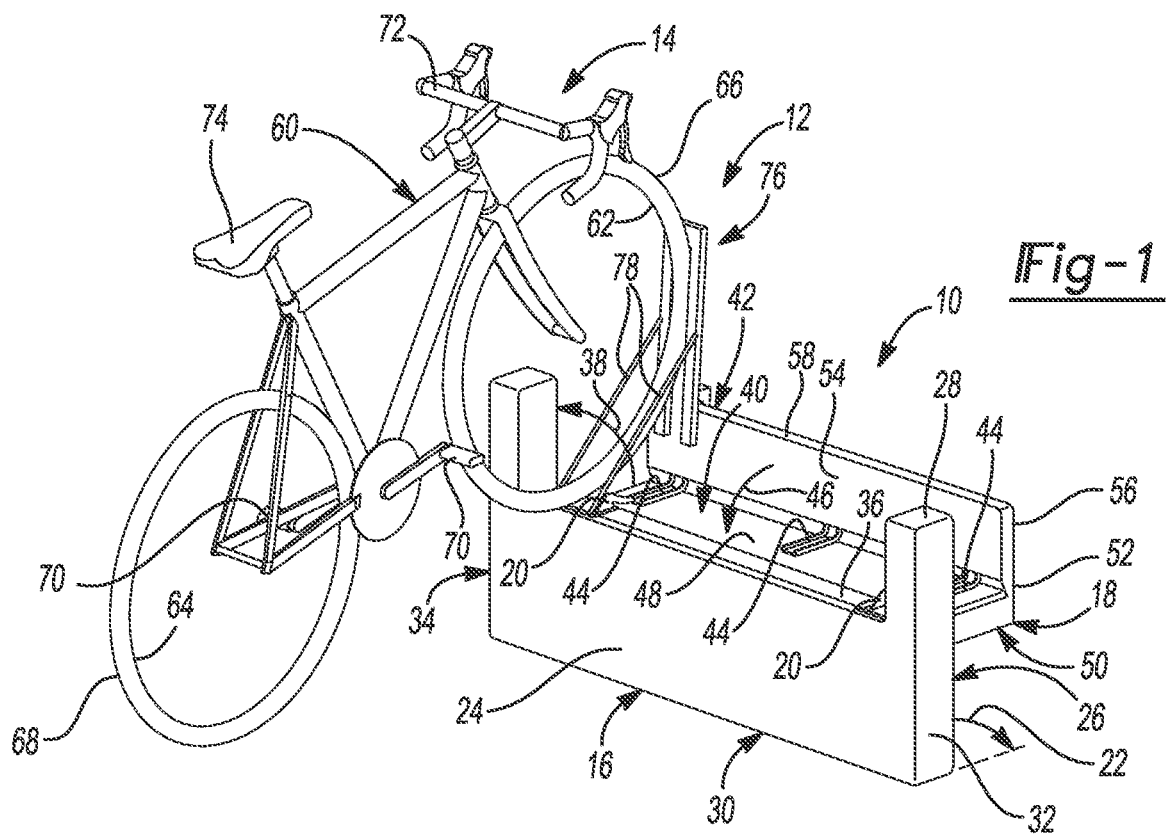
FIG. 1 is a perspective view of a tailgate including a major gate and a minor gate, an example of a bike rack according to the present disclosure, and a bicycle placed in the bike rack.

A bike rack according to the present disclosure secures the front tire of a bicycle to a tailgate of a cargo bed while the bicycle is upright and the rear tire of the bicycle rests on the floor of the cargo bed of a vehicle near the cabin of the vehicle. The tailgate includes a major gate and minor gate. The major gate is pivotable relative to the cargo bed between vertical and horizontal positions. The minor gate is pivotable relative to the major gate between vertical and horizontal positions. The minor gate includes an accessory compartment and a load stop that is pivotable relative to the accessory compartment between vertical and horizontal positions.

The bike rack is installed on the tailgate when the major gate is in its vertical position, the minor gate is in its horizontal position, and the load stop is in its vertical position. In this configuration, the minor gate extends the length of the cargo bed to accommodate a load that is longer than a typical cargo bed, and the load stop acts as a stop to prevent a load in the cargo bed from moving rearward out of the cargo bed. The bike rack includes a load stop bracket and a pair of braces. To install the bike rack, the load stop bracket is placed onto the load stop, and the braces are inserted into holes in a hinge that pivotally connects the minor gate to the major gate. When installed, the load stop bracket locks the load stop in its vertical position.

The bicycle is installed in the bike rack by placing the front tire of the bicycle between the braces of the bike rack and on the top surface of the accessory compartment. In one example, the bike rack includes a spring-loaded mechanism that applies a clamping force to the front tire to retain the front tire in the bike rack. Additionally or alternatively, clamps or straps may be used to secure the front tire to the back rack and/or to secure the load stop bracket to the load stop. When the bicycle is installed in the bike rack, the bike rack prevents movement of the bicycle in the fore-aft and vertical directions. Since the bike rack attaches to the tailgate as opposed to a trailer hitch of the vehicle, the bike rack enables using the trailer hitch to tow a trailer while the bike rack is used to secure a bicycle to the vehicle. In addition, the bike rack enables using the cargo bed since the bicycle is upright. While the present disclosure describes placing and securing the front tire and wheel of the bicycle in the bike rack, the rear tire and wheel of the bicycle may be placed in and secured to the bike rack in the same way and instead of the front tire and wheel.

Referring now to FIGS. 1 through 3, 5, and 7, a tailgate 10, a bike rack 12, and a bicycle 14 are shown. The tailgate 10 includes a major gate 16, a minor gate 18, and a pair of minor gate hinges 20 pivotally connecting the minor gate 18 to the major gate 16. Major gate hinges (not shown) pivotally connect the major gate 16 to a body component of a vehicle, such as a pickup bed of a pickup truck. The major gate 16 is pivotable about the major gate hinges between a vertical position, shown in FIGS. 1 through 3, and a horizontal position. The major gate 16 is adjusted from its vertical position to its horizontal position by rotating the major gate 16 in a downward direction 22. The major gate 16 is adjusted from its vertical position to its horizontal position by rotating the major gate 16 in an upward direction opposite of the downward direction 22. When the tailgate 10 is attached to a pickup bed and the major gate 16 is in its vertical position, the tailgate 10 closes off least part of the rear end of the pickup bed.

The major gate 16 has a front side or surface 24, a rear side or surface 26, a top side or surface 28, a bottom side or surface 30, a left side or surface 32, and a right side or surface 34. In addition, the major gate 16 has a recessed upper surface 36 that is recessed relative to the top surface 28 to accommodate the minor gate 18. The vertical distance between the recessed upper surface 36 and the top surface 28 is approximately equal to the height of the minor gate 18.

Figure 2:
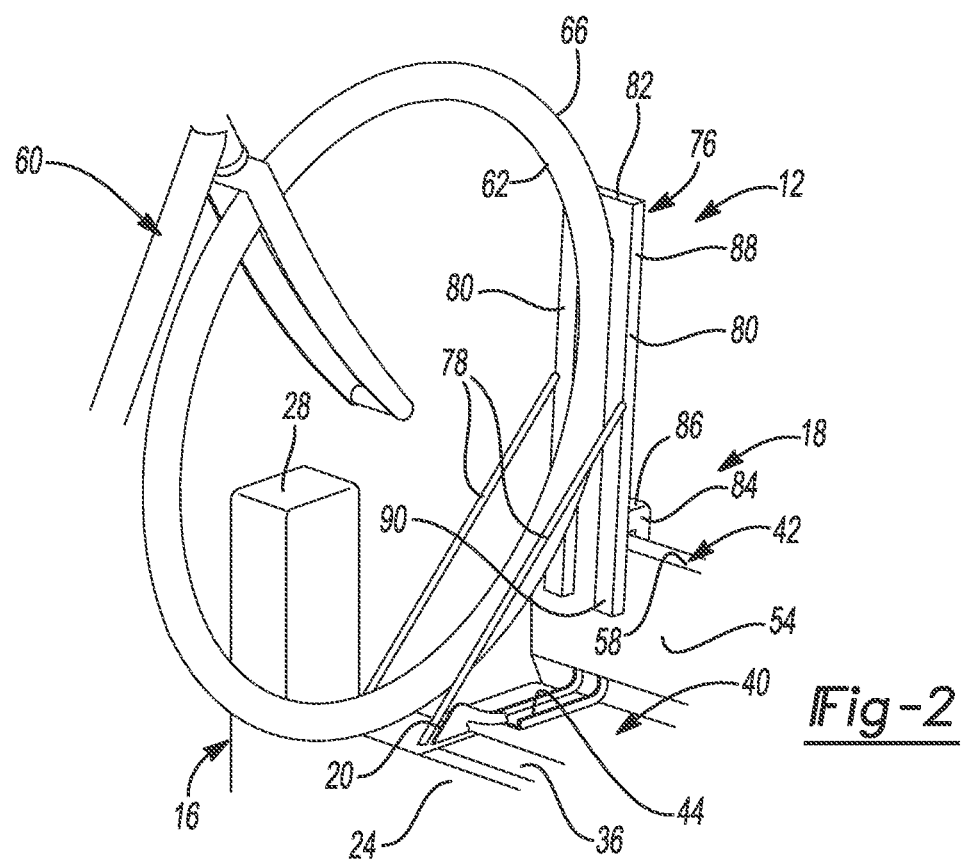
FIG. 2 is an enlarged view of a portion of FIG. 1.
Figure 3:
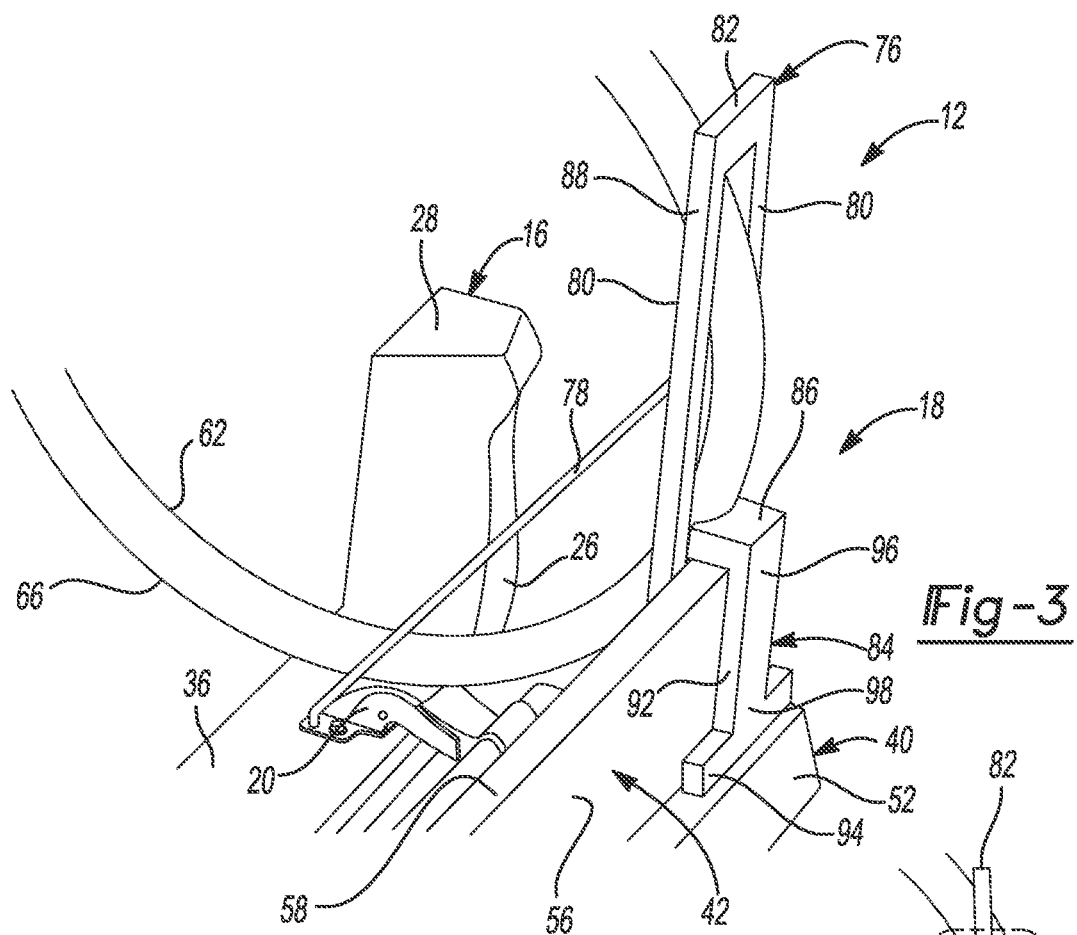
FIG. 3 is another perspective view of the tailgate, the bike rack, and the bicycle of FIG. 1.

The minor gate 18 is pivotable about the minor gate hinges 20 between a horizontal position, shown in FIGS. 1 through 3, and a vertical position. The minor gate 18 is adjusted from its horizontal position to its vertical position by rotating the minor gate 18 in an upward direction 38. The minor gate 18 is adjusted from its vertical position to its horizontal position by rotating the major gate 16 in a downward direction opposite of the upward direction 38.

The minor gate 18 includes an accessory compartment 40, a load stop 42, and load stop hinges 44 pivotally connecting the load stop 42 to the accessory compartment 40. The load stop 42 is pivotable about the load stop hinges 44 between a vertical position, shown in FIGS. 1 through 3, and a horizontal position. The load stop 42 is adjusted from its vertical position to its horizontal position by rotating the load stop 42 in a downward direction 46. The load stop 42 is adjusted from its horizontal position to its vertical position by rotating the load stop 42 in an upward direction opposite of the downward direction 46.

When the minor gate 18 is in its horizontal position as shown in FIGS. 1 through 3, the accessory compartment 40 has a top side or surface 48, a bottom side or surface 50, and a rear side or surface 52. When the minor gate 18 is rotated in the upward direction 38 from its horizontal position to its vertical position, the rear surface 52 of the accessory compartment 40 becomes the top surface of the minor gate 18. In addition, when the minor gate 18 is in its vertical position, the top surface of the minor gate 18 is flush with the top surface 28 of the major gate 16.

When the load stop 42 is in its vertical position as shown in FIGS. 1 through 3, the load stop 42 has a front side or surface 54, a rear side or surface 56, and a top side or surface 58. When the load stop 42 is rotated in the downward direction 46 from its vertical position to its horizontal position while the minor gate 18 is in its horizontal position, the rear surface 56 of the load stop 42 becomes the top surface of the minor gate 18. If the minor gate 18 is then rotated in the upward direction 38 from its horizontal position to its vertical position, the rear surface 56 of the load stop 42 becomes the front surface of the minor gate 18. In addition, the front surface of the minor gate 18 is flush with the front surface 24 of the major gate 16.

The tailgate 10 can be arranged in a number of different configurations for a number of different purposes, some of which are described below in the context of the tailgate 10 being attached to the rear end of a pickup bed. In one example, the major gate 16 can be adjusted to its horizontal position and the minor gate 18 can be adjusted to its vertical position to provide access for a person to retrieve items from the pickup bed. In addition, when the major gate 16 is in its horizontal position and the minor gate 18 is in its vertical position, the load stop 42 can be adjusted to its vertical position to serve as a step for a person entering the pickup bed.

In another example, the major and minor gates 16 and 18 can be adjusted to their vertical positions and the load stop 42 can be adjusted to its horizontal position to serve as a work surface for a person standing rearward of the pickup bed. In the example shown in FIGS. 1 through 3, the minor gate 16 is adjusted to its horizontal position to increase the length of the cargo area in the pickup bed. In addition, the load stop 42 is adjusted to its vertical position to stop a load in the pickup bed, such as the bicycle 14, from moving rearward out of the pickup bed.

The bicycle 14 includes a frame 60, a front wheel 62, a rear wheel 64, a front tire 66, a rear tire 68, pedals 70, handlebars 72, and a seat 74. In the example shown, the bicycle 14 is a road bike. However, the bike rack 12 may be used to secure a number of different types of bicycles to the vehicle. For example, the bike rack 12 may be used to secure a mountain bike to the vehicle.

The bike rack 12 includes a load stop bracket 76 and a pair of braces 78. The load stop bracket 76 includes a pair of front vertical bars 80, a crossbar 82, a rear vertical bar 84, a horizontal bar 86, Each front vertical bar 80 has an upper end 88 and a lower end 90. The crossbar 82 connects the upper ends 88 of the front vertical bars 80 to one another. The horizontal bar 86 connects the rear vertical bar 84 to the front vertical bars 80. The horizontal bar 86 is attached to the front vertical bars 80 at a location between their upper and lower ends 88 and 90.

Figure 5:
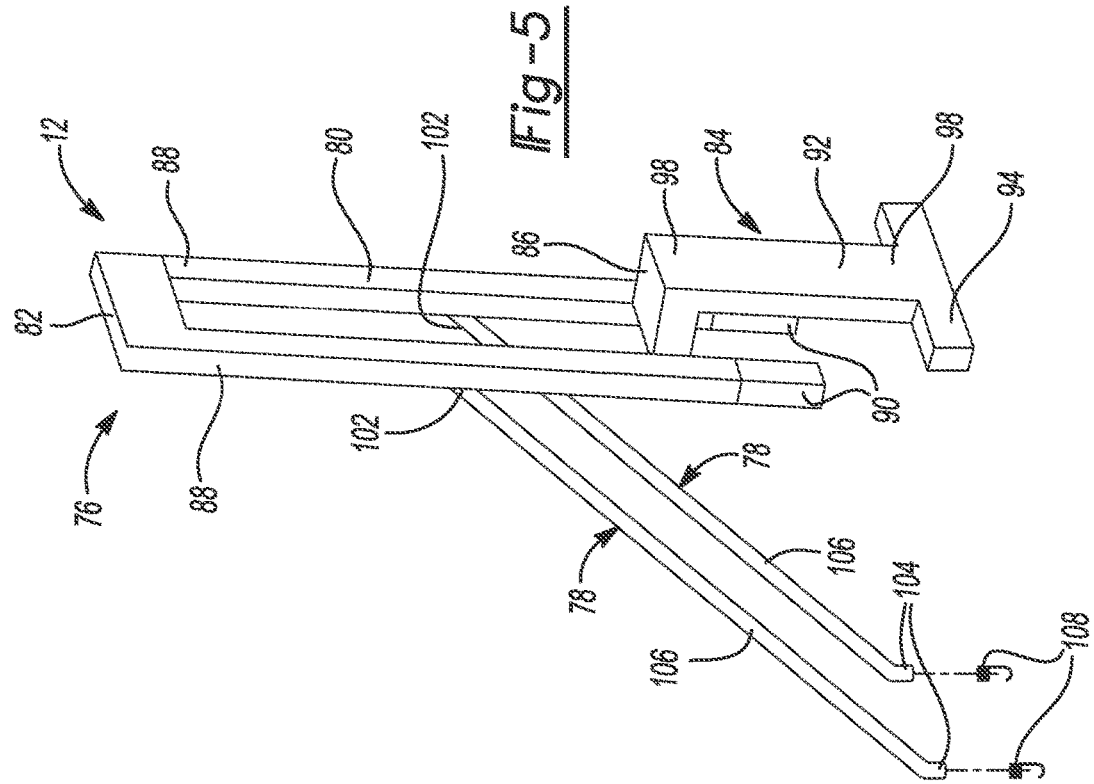
FIG. 5 is a perspective view of the bike rack of FIG. 1 by itself.

As best shown in FIGS. 3 and 5, the rear vertical bar 84 is T-shaped and includes a first rectangular section 92 and a second rectangular section 94. The first rectangular section 92 has a length that extends vertically, and the second rectangular section 94 has a length that extends horizontally. The length of the second rectangular section 94 is greater than the length of the first rectangular section 92. The first rectangular section 92 has an upper end 96 attached to the horizontal bar 86 and a lower end 98 attached to the second rectangular section 94 at the midpoint of its length.

Figure 7:
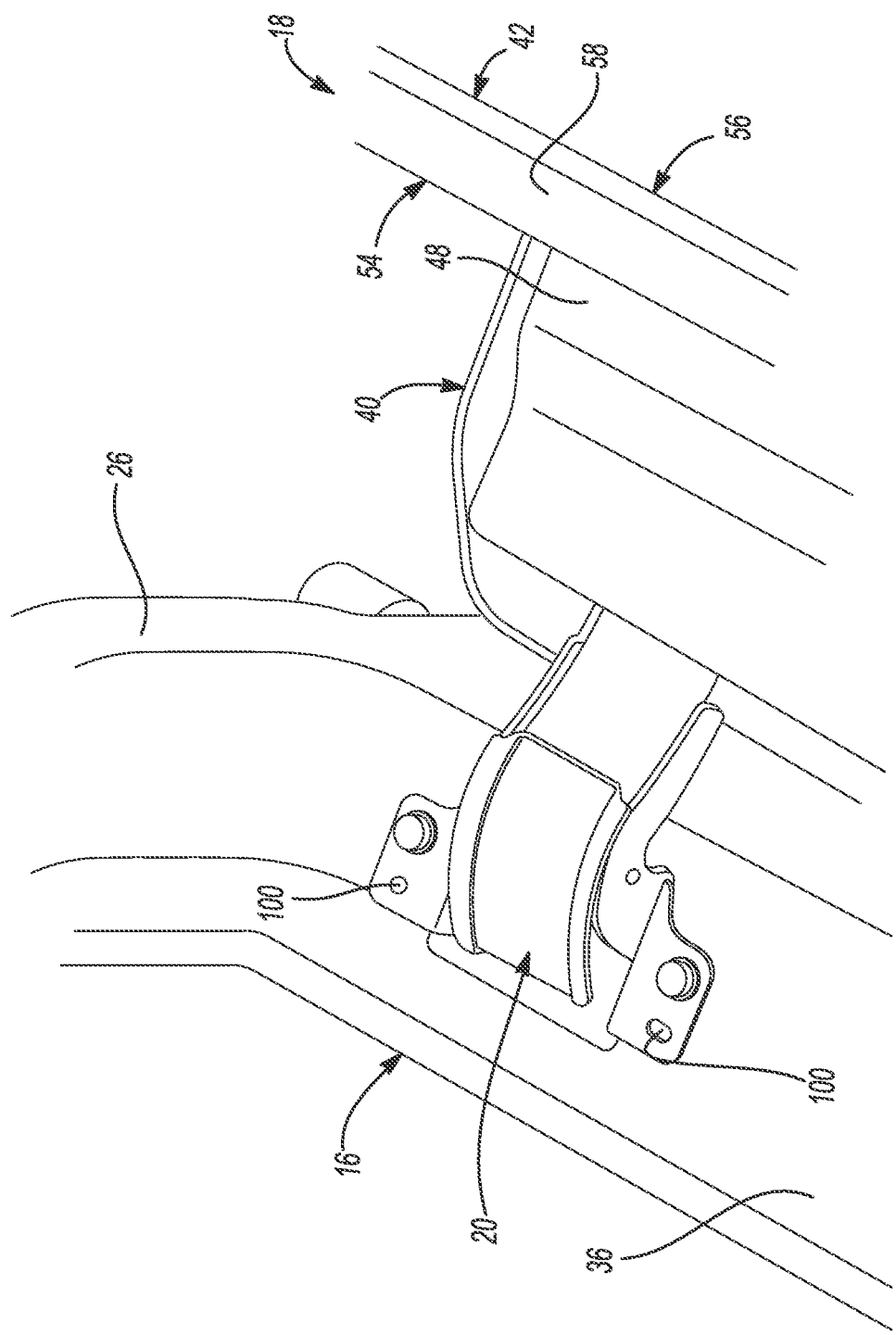
FIG. 7 is a perspective view of a minor gate hinge connecting the minor gate of FIG. 1 to the major gate of FIG. 1.

As best shown in FIG. 7, each minor gate hinge 20 has a pair of datum holes 100 that are used to locate the minor gate hinges 20 relative to the major gate 16 during assembly. As discussed below, the datum holes 100 are also used to secure the bike rack 12 to the tailgate 10. Each brace 78 may be or include a solid rigid rod, a hollow rigid rod or tube, or a flexible chord. As best shown in FIG. 5, each brace 78 has an upper end 102 and a lower end 104. The upper end 102 of each brace 78 is attached to one of the front vertical bars 80 at the midpoint of its height. The lower end 104 of each brace 78 may be inserted into one of the datum holes 100 in the minor gate hinges 20 to secure the bike rate 12 to the tailgate 10.

In one example, the each brace 78 is a rigid rod or tube made of metal or plastic, and the lower end 104 of each brace 78 is curved or bent as shown in FIG. 5 to prevent the lower end 104 from falling out of the datum hole 100 in which the lower end 104 is inserted. In another example, each brace 78 includes a flexible chord 106 and a fastener 108 (e.g., a hook) attached to the flexible chord 106 and disposed at the lower end 104 thereof. Each fastener 108 can be inserted into one of the datum holes 100 to secure the bike rate 12 to the tailgate 10.

The flexible chord 106 may have a first length when the flexible chord 106 is in a relaxed state (e.g., when the bike rack 12 is not installed on the tailgate 10), and the flexible chord 106 may have a second length when the flexible chord 106 is securing the bike rack 12 to the tailgate 10. The second length may be equal to the distance between the location where the flexible chord 106 is attached to the load stop bracket 76. This distance may be greater than the first length such that the flexible chord 106 is in tension when the bike rack 12 is installed on the tailgate 10.

To install the bike rack 12, the load stop bracket 76 is placed onto the load stop 42 when the major gate 16 is in its vertical position, the minor gate 18 is in its horizontal position, and the load stop 42 is in its vertical position. In turn, the horizontal bar 86 extends over the top surface 58 of the load stop 42, the front vertical bars 80 are disposed on the front side 54 of the load stop 42, and the rear vertical bar 84 is disposed on the rear side 56 of the load stop 42. In addition, the lower ends 104 of the braces 78 or the fasteners 108 are inserted into the datum holes 100 in the minor gate hinges 20 when the load stop bracket 76 is placed onto the load stop 42. When the bike rack 132 is installed, the bike rate 132 locks the load stop 42 in its vertical position. The front tire 66 of the bicycle 14 can then be placed in the bike rack 12 such that the front vertical bars 80 and the braces 78 are disposed on opposite sides of the front tire 66 as shown in FIGS. 1 through 3.

Figure 4:
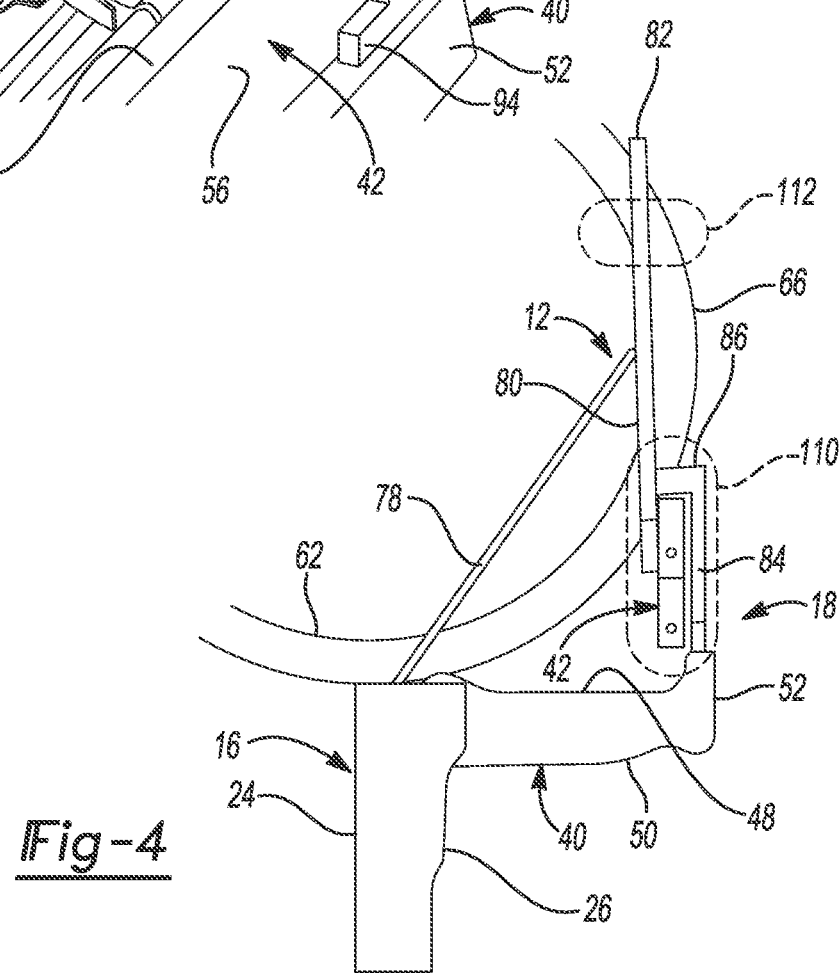
FIG. 4 is a side view of the tailgate, the bike rack, and the bicycle of FIG. 1 with clamps or straps securing the front wheel of the bicycle to the bike rack and securing the bike rack to the tailgate.

Referring now to FIG. 4, the first clamp or strap 110 may be used to secure the load stop bracket 76 to the load stop 42, and a second clamp or strap 112 may be used to secure the front wheel 62 and the front tire 66 to the load stop bracket 76. The first strap 110 may be routed in a loop extending between the front vertical bars 80, along the length of the rear vertical bar 84, between the load stop bracket 76 and the accessory compartment 40, and along the front surface 54 of the load stop 42. The second strap 112 may be routed in a loop extending through the front wheel 62 and around the front side of the load stop bracket 76 and the front tire 66. The first and second straps 110 and 112 may be flexible and placed under tension to ensure that the load stop bracket 76 is tightly secured to the load stop 42, and the front wheel 62 and the front tire 66 are tightly secured to the load stop bracket 76.

Figure 6:
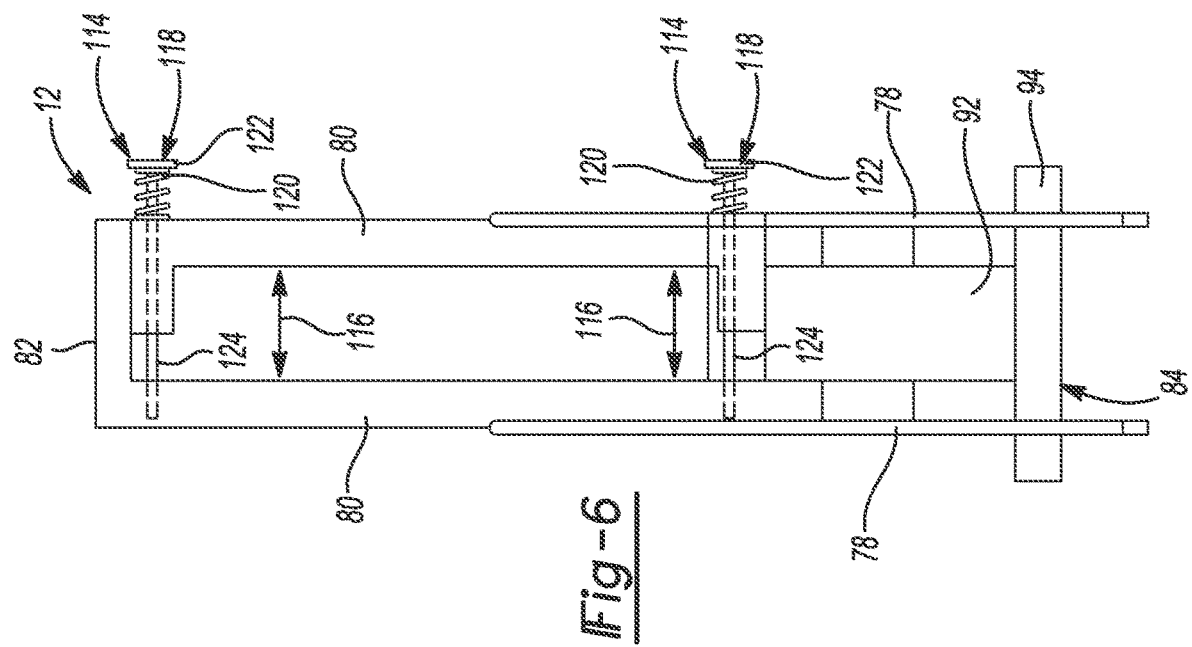
FIG. 6 is a front view of the bike rack of FIG. 1 modified to include a spring-loaded mechanism that applies a clamping force to a tire in the bike rack.

Referring now to FIG. 6, the bike rack 12 may include a pair of spring-loaded mechanisms 114 that enable one front vertical bar 80 to move relative to the other front vertical bar 80 in a lateral direction 116 to accommodate different bike tire sizes and types. For example, the spring-loaded mechanisms 114 cause the one front vertical bar 80 to move toward the other front vertical bar 80 when a bike with skinny tires, such as a road bike, is installed in the bike rack 12. Conversely, the spring-loaded mechanisms 114 allow the one front vertical bar 80 to move away from the other front vertical bar 80 when a bike with fat tires, such as a mountain bike, is installed in the bike rack 12. In addition, the spring-loaded mechanisms 114 apply a clamping force in the lateral direction 116 to a bike tire placed in the bike rack 12. Further, the front vertical bars 80 are connected to one another by the spring-loaded mechanisms 114 instead of the crossbar 82.

Each spring-loaded mechanism 114 includes a pin 118 and a spring 120. Each pin 118 includes a head 122 and a shaft 124. Each pin 118 extends completely through the one front vertical bars 80 and partially into the other front vertical bar 80. Each spring 120 is disposed about the shaft 124 of one of the pins 118 and is captured between the head 122 of the one pin 118 and a surface of the one front vertical bar 80 that faces away from the other front vertical bar 80.

Referring now to FIGS. 8 and 9, the bike rack 12 may include one or more pivot pins 126 that enable folding the bike rack 12 in a compact unit when not in use. Two of the pivot pins 118 pivotally connect upper halves 128 of the front vertical bars 80 to lower halves 130 of the front vertical bar 80. The upper halves 128 of the front vertical bars 80 may be pivoted about these pivot pins 126 between an unfolded position shown in FIG. 8 and a folded position shown in FIG. 9. Another one of the pivot pins 126 pivotally connects the rear vertical bar 84 to the crossbar 82.

Referring now to FIGS. 10 through 13, a bike rack 132 may be used in place of the bike rack 12 to secure the bicycle 14 to tailgate 10. The bike rack 132 includes a pair of front vertical bars 134, a rear vertical bar 136, and a rigid rod 138. Each front vertical bar 134 has an upper and 140 and a lower end 142. The rigid rod 138 may be a solid rod or a hollow rod (e.g., a tube) and has opposite ends 144 (FIG. 13) that are curved. The rigid rod 138 forms or includes a U-shaped section 146 and a pair of braces 148 projecting from opposite ends 150 of the U-shaped section 146. The U-shaped section 146 and/or the braces 148 form a horizontal bar that connects the rear vertical bar 136 to the front vertical bars 134. The front vertical bars 134, the rear vertical bar 136, and the U-shaped section 146 form a load stop bracket 152.

Figure 10:
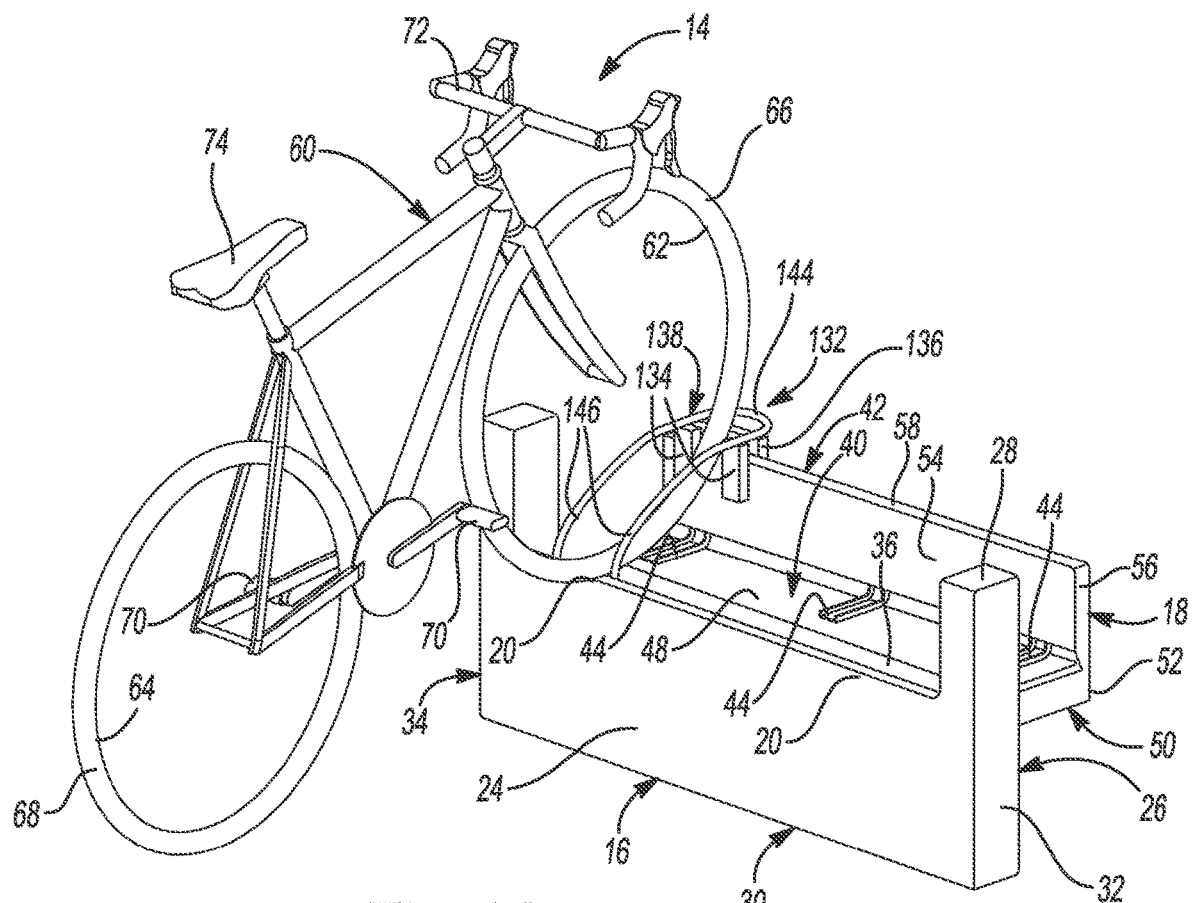
FIG. 10 is a perspective view of the tailgate and the bicycle of FIG. 1 with the bicycle placed in another example of a bike rack according to the present disclosure.
Figure 11:
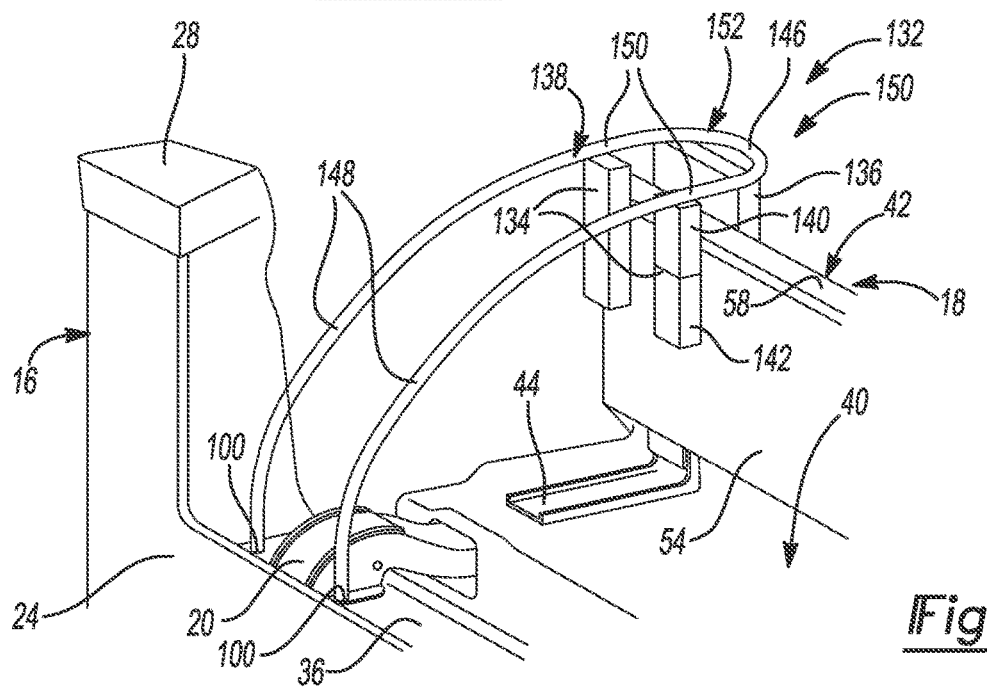
FIG. 11 is an enlarged view of a portion of FIG. 10.

To install the bike rack 132, the load stop bracket 152 is placed onto the load stop 42 when the major gate 16 is in its vertical position, the minor gate 18 is in its horizontal position, and the load stop 42 is in its vertical position. In turn, the U-shaped section 146 extends over the top surface 58 of the load stop 42, the front vertical bars 134 are disposed on the front side 54 of the load stop 42, and the rear vertical bar 136 is disposed on the rear side 56 of the load stop 42. In addition, the curved ends 144 of the braces 148 are inserted into the datum holes 100 in the minor gate hinges 20 when the load stop bracket 152 is placed onto the load stop 42. When the bike rack 132 is installed, the bike rate 132 locks the load stop 42 in its vertical position. The front tire 66 of the bicycle 14 can then be placed in the bike rack 132 such that the front vertical bars 134 and the braces 148 are disposed on opposite sides of the front tire 66 as shown in FIG. 10.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A bike rack for a vehicle with a tailgate that includes a major gate, a minor gate, and a hinge connecting the minor gate to the major gate such that the minor gate is pivotable between a vertical position and a horizontal position, the minor gate including a main body and a load stop configured to pivot relative to main body between the vertical position and the horizontal position, the bike rack comprising:
    a load stop bracket configured to be placed onto the load stop when the load stop is in the vertical position such that the load stop bracket extends over a top surface of the load stop and is disposed on front and rear sides of the load stop; and
    a pair of braces attached to the load stop bracket, configured to extend into a pair of holes in the hinge when the load stop bracket is placed onto the load stop, and configured to be disposed on opposite sides of a tire on a bike.

2. The bike rack of claim 1 wherein the load stop bracket includes a pair of front vertical bars configured to be disposed on the front side of the load stop, a rear vertical bar configured to be disposed on the rear side of the load stop, and a horizontal bar connecting the rear vertical bar to the front vertical bars and configured to extend over the top surface of the load stop.

3. The bike rack of claim 2 wherein the load stop bracket further includes a crossbar connecting upper ends of the front vertical bars to one another.

4. The bike rack of claim 2 wherein the front vertical bars are configured to be disposed on opposite sides of the tire.

5. The bike rack of claim 2 wherein the horizontal bar is formed by the braces.

6. The bike rack of claim 2 further comprising a spring-loaded mechanism configured to bias one of the front vertical bars toward the other one of the front vertical bars and thereby apply a clamping force to the tire.

7. The bike rack of claim 6 wherein the spring-loaded mechanism includes a pin and a spring, the pin extending through one of the front vertical bars and into the other front vertical bar, the spring being disposed about a shaft of the pin and captured between a head of the pin and a surface of the one front vertical bar that faces away from the other front vertical bar.

8. The bike rack of claim 1 wherein each of the braces includes a flexible chord and a fastener configured to be inserted into one of holes in the hinge.

9. The bike rack of claim 8 wherein the flexible chord has a length that is less than a distance between a location where the flexible chord is attached to the load stop bracket and the one hole in the hinge in which the fastener is configured to be inserted such that the flexible chord is in tension when the bike rack is installed.

10. The bike rack of claim 1 wherein each of the braces includes a rigid tube having a curved end configured to be inserted into one of the holes in the hinge.

11. The bike rack of claim 1 wherein the braces are formed by a single rigid tube having a pair of curved ends configured to be inserted into the holes in the hinge.

12. The bike rack of claim 11 wherein the rigid tube forms the braces and a U-shaped section that connects the braces to one another.

13. The bike rack of claim 1 wherein the load stop bracket includes a pivot pin about which the load stop bracket foldable.

14. A bike rack for a vehicle with a tailgate that includes a major gate, a minor gate, and a hinge connecting the minor gate to the major gate such that the minor gate is pivotable between a vertical position and a horizontal position, the minor gate including a main body and a load stop configured to pivot relative to main body between the vertical position and the horizontal position, the bike rack comprising:
a load stop bracket including a pair of front vertical bars, a crossbar connecting upper ends of the front vertical bars to one another, a rear vertical bar, and a horizontal bar connecting the rear vertical bar to the front vertical bars, wherein the load stop bracket is configured to be placed onto the load stop when the load stop is in the vertical position such that the horizontal bar extends over a top surface of the load stop, the front vertical bars are disposed on a front side of the load stop, and the rear vertical bar is disposed on a rear side of the load stop; and
a pair of braces attached to the load stop bracket, configured to extend into a pair of holes in the hinge when the load stop bracket is placed onto the load stop, and configured to be disposed on opposite sides of a tire on a bike.

15. The bike rack of claim 14 wherein each of the braces includes a flexible chord and a fastener configured to be inserted into one of holes in the hinge.

16. The bike rack of claim 14 wherein the braces are rigid and each of the braces has a curved end configured to be inserted into one of the holes in the hinge.

17. The bike rack of claim 14 wherein the rear vertical bar is T-shaped with a first rectangular section having a first length that extends vertically and a second rectangular section attached to a lower end of the first rectangular section and having a second length that extends horizontally and is less than the first length.

18. A bike rack for a vehicle with a tailgate that includes a major gate, a minor gate, and a hinge connecting the minor gate to the major gate such that the minor gate is pivotable between a vertical position and a horizontal position, the minor gate including a main body and a load stop configured to pivot relative to main body between the vertical position and the horizontal position, the bike rack comprising:
a pair of front vertical bars;
a rear vertical bar, and
a rigid rod including a U-shaped section and a pair of braces projecting from opposite ends of the U-shaped section, the rigid rod connecting the rear vertical bar to the front vertical bars to form a load stop bracket, wherein:
the load stop bracket is configured to be placed onto the load stop when the load stop is in the vertical position such that the U-shaped section extends over a top surface of the load stop, the front vertical bars are disposed on a front side of the load stop, and the rear vertical bar is disposed on a rear side of the load stop;
the braces are configured to extend into a pair of holes in the hinge when the load stop bracket is placed onto the load stop; and
the braces are configured to be disposed on opposite sides of a tire on a bike.

19. The bike rack of claim 18 wherein the rigid rod is hollow and each of the braces has a curved end configured to be inserted into one of the holes in the hinge.

20. The bike rack of claim 18 wherein the front vertical bars are configured to be disposed on opposite sides of the tire.

* * * * *